W. FOSKET.
HARVESTER.
No. 174,623. Patented March 14, 1876.
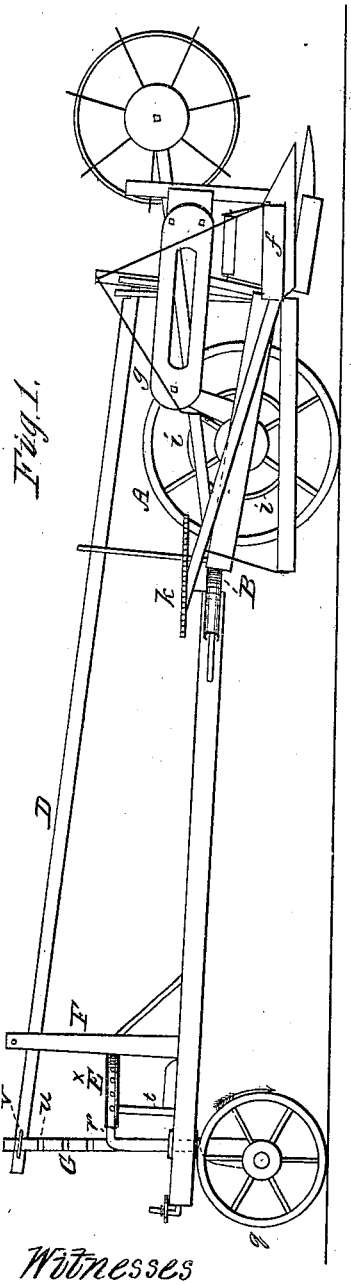
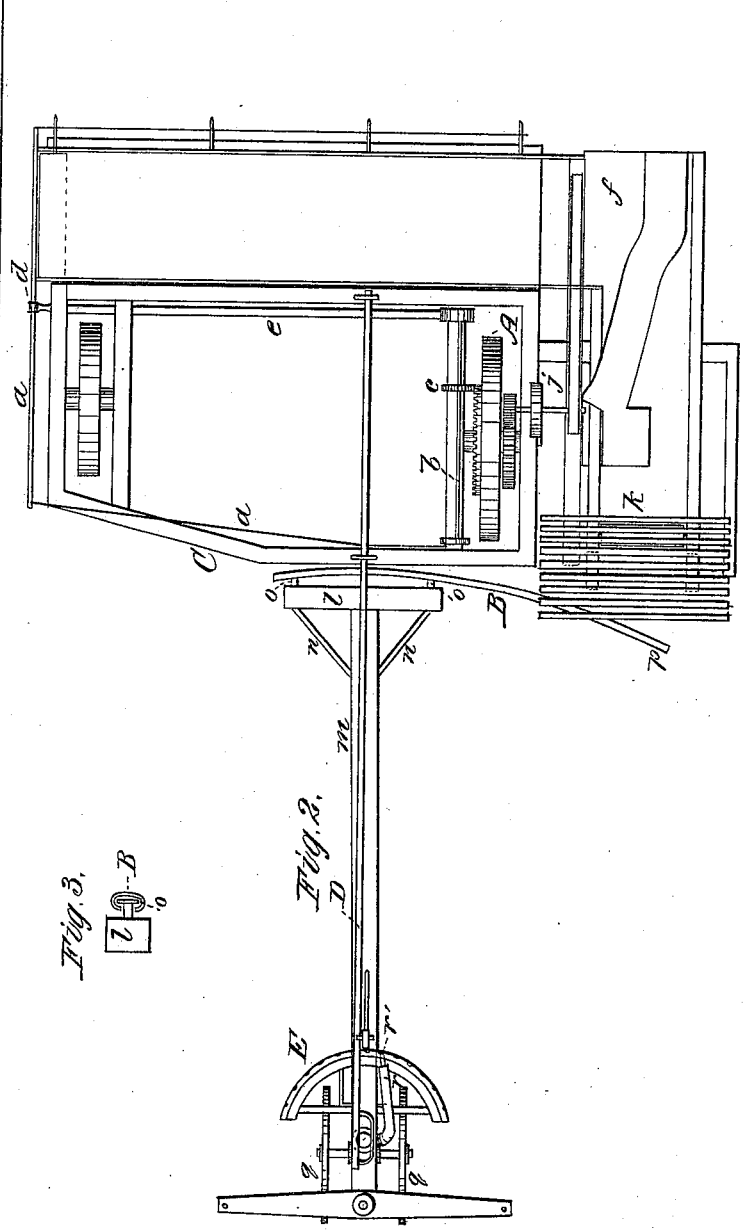
Witnesses
Inventor

UNITED STATES PATENT OFFICE.

WILLIAM FOSKET, OF LEMARS, IOWA.

IMPROVEMENT IN HARVESTERS.

Specification forming part of Letters Patent No. 174,623, dated March 14, 1876; application filed February 13, 1875.

*To all whom it may concern:*

Be it known that I, WILLIAM FOSKET, of Lemars, county of Plymouth, and State of Iowa, have invented certain new and useful Improvements in Combined Harvester and Header; and I do hereby declare that the following is a full, clear, and exact description of the same, reference being had to the annexed drawings, forming part of this specification, and to the letters and figures of reference marked thereon, in which—

Figure 1 is a side elevation of my invention, and Fig. 2 a plan view of the same. Fig. 3 is a detached end view of the tongue, showing the manner of attachment to the arc or curved plate.

This invention has relation to combined harvesters and headers, and its object is to construct a device of this character that will enable grain to be cut for a much longer time during the year by adapting it to be used either as a harvester or header; and the invention consists in the construction and arrangement of the several parts, as will be hereinafter more fully described and subsequently pointed out in the claims.

In the accompanying drawings, A represents the bull-wheel for imparting motion to the several operating parts of the machine. The sickle is moved by the levers $a$ $a$, the same being connected to the bull-wheel A by means of the axle-tree $b$ and cog-wheel $c$, and works upon a fulcrum, $d$. The belt $e$ operates the carrier, which in turn delivers the grain to the box $f$. As soon as a sufficient amount of grain has accumulated in the box $f$, it is carried backward to the binders by the self-rake $g$, which derives its motion from a suitable belt run by the wheel $i$. The reel is moved by the same mechanism as the rake, but directly by means of the wheel $j$. $k$ is the dumper, which is so arranged as to throw the bundles to the right of the machine.

The machine is to turn corners by means of the small wheels and handle in the rear thereof, and also by the movement of the tongue $m$, the end of which is secured to the cross-beam $l$ by brace-rods $n$. Upon the inner side of the cross-beam $l$, and near each end thereof, are buttons or headed bolts $o$, which fit and slide within the curved plate or arc of a circle, B, as illustrated in Fig. 3. The movement of the tongue $m$ brings its end to which the cross-beam $l$ is secured to the end $p$ of the arc of a circle, B; said tongue at this point acting in the capacity of a lever, turning the machine quickly and in a smaller space than others. The means employed for operating the tongue $m$, in transferring it to the end $p$ of the arc of a circle, B, is by any suitable connection passing from the neck-yoke of the horses to the end of the tongue.

The grain-platform is raised or lowered by the lever D, which may be easily regulated by the driver standing at $x$. The small wheels $q$ $q$ are directed by means of the handle $r$, and are held in place by a pin, $r$, formed on the end of the handle and bearing against a curved or semicircular plate, E, held in place by spring-rods $t$. The handle $r$ is retained in place by the plate E and spring-rods $t$, the same allowing the plate to yield, so that, when swinging the handle to the right, the plate is pressed down upon by the left hand and upon the handle with the right hand until the wheels are turned in the direction required.

The axle upon which the wheels $q$ $q$ are secured passes through a plate secured to the lower end of vertical rod G, said rod passing up through the end of the tongue $m$, and having near its upper end a series of notches, $u$, to enable the lever D to be held at the desired height. The end of said lever D has a staple, $v$, which passes over the rod G and engages with the notches $u$.

The object of employing two wheels $q$ $q$ in the rear is to cause less cutting in of the wheels and also to make the driver's position more firm. The finger-bar is of steel and the reel-arms of wire, connected together in any suitable manner. To change the harvester into a header, the binding attachment may be removed and a spout attached so as to receive the grain as it comes from the carrier.

Having now fully described my invention, what I claim as new, and desire to secure by Letters Patent, is—

1. In combination with a harvesting or heading machine, having secured to the frame thereof a curved plate or arc of a circle, B, the tongue m, cross-beam l, and buttons or headed bolts o, substantially as and for the purpose set forth.

2. The curved plate or arc of a circle B, tongue m, cross-beam l, and buttons or headed bolts o, in combination with the lever D and vertical rod G, with notches u, substantially as and for the purpose specified.

3. The combination with the rod G, carrying-wheels q, and the curved handle r, with pin r', of the semicircular plate E, and the spring-rods t, constructed to operate as described.

WM. FOSKET.

Witnesses:
F. W. GUERNSEY,
A. H. LAWRENCE.